(12) United States Patent
Randal

(10) Patent No.: US 7,571,153 B2
(45) Date of Patent: Aug. 4, 2009

(54) SYSTEMS AND METHODS FOR PERFORMING STREAMING CHECKS ON DATA FORMAT FOR UDTS

(75) Inventor: Paul S. Randal, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 393 days.

(21) Appl. No.: 11/091,080

(22) Filed: Mar. 28, 2005

(65) Prior Publication Data

US 2006/0218144 A1 Sep. 28, 2006

(51) Int. Cl.
*G06F 7/00* (2006.01)
(52) U.S. Cl. .................... 707/2; 707/101; 707/103 R; 711/100; 714/699
(58) Field of Classification Search ............ 707/2, 707/101, 103; 711/100; 714/699
See application file for complete search history.

(56) References Cited

U.S. PATENT DOCUMENTS

| | | | | |
|---|---|---|---|---|
| 6,594,651 | B2 * | 7/2003 | Kabra et al. ............... | 707/2 |
| 6,708,186 | B1 * | 3/2004 | Claborn et al. ............ | 707/102 |
| 6,732,354 | B2 * | 5/2004 | Ebeling et al. ............. | 717/119 |
| 6,782,394 | B1 * | 8/2004 | Landeck et al. ........... | 707/104.1 |
| 7,092,933 | B1 * | 8/2006 | Milby ........................ | 707/2 |
| 7,213,015 | B1 * | 5/2007 | Luck et al. ................. | 707/3 |
| 2004/0006575 | A1 * | 1/2004 | Visharam et al. .......... | 707/104.1 |
| 2004/0123202 | A1 * | 6/2004 | Talagala et al. ........... | 714/736 |
| 2004/0210572 | A1 * | 10/2004 | Shin .......................... | 707/3 |
| 2005/0182797 | A1 * | 8/2005 | Adkins et al. .............. | 707/200 |
| 2005/0210027 | A1 * | 9/2005 | Aggarwal et al. .......... | 707/6 |
| 2005/0289160 | A1 * | 12/2005 | Ashwin et al. ............. | 707/100 |

OTHER PUBLICATIONS

Chinese OA dated Dec. 26, 2008 for U.S. Appl. No. 200610051564. 3, 14 pages.

* cited by examiner

*Primary Examiner*—John R. Cottingham
*Assistant Examiner*—Alexandria Y Bromell
(74) *Attorney, Agent, or Firm*—Workman Nydegger

(57) ABSTRACT

The subject invention relates to systems and methods that perform consistency checks of user defined type (UDT) fragments utilizing a stream of data without wholesale copying of the data. Streaming consistency checks facilitate discovering invalid fragments as soon as possible such that the entire UDT fragment does not have to be read, stored, analyzed, etc. Additionally, a UDT fragment can be evaluated without being completely materialized; thus, systems and/or methods employing the subject invention can yield improved performance as compared to conventional techniques by reducing required resources and enabling faster detection of invalid structures.

20 Claims, 10 Drawing Sheets

SYSTEMS AND METHODS FOR PERFORMING STREAMING CHECKS ON DATA FORMAT FOR UDTS

TECHNICAL FIELD

The subject invention generally relates to consistency checking, and more particularly to systems and methods that facilitate analyzing and verifying the consistency of a user defined type (UDT) fragment via streaming checks of data without wholesale copying of the data.

BACKGROUND OF THE INVENTION

A database is a collection of related files or data that is created and managed by a database management system (DBMS) in a predefined format. For example, the DBMS can be arranged in tables that contain rows and columns. Queries can be constructed in accordance with a query language (e.g., structured query language (SQL)) in order to access content of a table in the database. Likewise, data can be input (e.g., imported) into the table via an external source. Conventionally, the DBMS can manage any form of data including text, images, sound and video. In accordance therewith, database and file structures are determined by a software application.

The DBMS can employ predefined simple data types that can refer to a category of variables that is determined by the kind of data stored in it. For example, integer, floating point, string, date, binary, boolean, character, short, and long are common simple data types. Recently, efforts have been directed to the utilization of a user defined type (UDT) to increase DBMS storage flexibility and management. More particularly, the functionality of a UDT affords developers and users the flexibility to create a UDT (e.g., via a declarative language), which is compatible with a particular database application.

UDTs enable the modeling and manipulation of complex types within a storage environment (e.g., DBMS). UDTs further provide for concepts such as inheritance, containment, and multi-valued embeddings. A UDT can comprise a series of fragments of different types (e.g., integer, floating point, string, date, binary, boolean, character, short, long, . . . ). For example, a UDT fragment can be a portion of a UDT that has associated metadata (e.g., for a UDT related to a person, one fragment can hold the person's name, another can relate to the person's address, . . . ). The size of a UDT fragment can vary depending on its type and/or an associated payload. UDTs can be stored in data page(s) and/or transferred as part of data packet(s). Due to their varying sizes, UDTs and/or UDT fragments can be split between disparate data pages when stored (or data packets while transferred). UDTs and/or UDT fragments can be split, for example, if there is not enough free space within a data page to store the UDT and/or UDT fragment. For instance, a 10,000 byte UDT cannot be stored in one 8192 byte data page; thus, such a UDT is split between data pages. Additionally, depending upon a location of the split of the UDT, portions of a UDT fragment may be separated between disparate data pages. Splitting of a UDT fragment can cause a simple data type to be split; by way of example, a four byte integer can be stored such that a first byte is stored in a first data page and the remaining three bytes are stored in one or more other data pages.

Conventionally, before a consistency check can be performed on a fragment, the entire fragment has to be materialized in memory. Thus, in the case of a fragment split between two disparate data pages or data packets, both sections of the fragment would have to be copied to another area of memory for further processing. Thus, currently employed techniques are expensive in terms of memory and processing resources. Additionally, this expense increases as the fragment size (and hence an associated number of data pages or data packets) increases.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and methods that perform consistency checks of user defined type (UDT) fragments utilizing a stream of data without wholesale copying of the data. Streaming consistency checks facilitate discovering invalid fragments as soon as possible such that the entire UDT fragment does not have to be read, stored, analyzed, etc. Additionally, a UDT fragment can be evaluated without being completely materialized; thus, systems and/or methods employing the subject invention can yield improved performance as compared to conventional techniques by reducing required resources and enabling faster detection of invalid structures.

According to an aspect of the subject invention, a system is provided that facilitates evaluating user defined type (UDT) fragments for errors. The system includes a data block processing component that receives a stream of data blocks that comprise UDT fragments, identifies a fragment type for each of the UDT fragments (e.g., when a start of a new fragment is encountered), and discards the data blocks as they are processed. Additionally, the system includes a check object that examines the UDT fragments based in part upon the corresponding identified fragment types and generates an indication of an error when appropriate. The check objects, for instance, can facilitate materializing basic data types that have been split between data blocks.

Pursuant to another aspect of the subject invention, a method is provided that facilitates consistency checking of UDTs. The method can include receiving data blocks that contain UDT fragments, identifying types of the UDT fragments, employing respective check objects to determine if any of the UDT fragments include an error, and discarding the data blocks as they are processed.

According to another aspect of the subject invention, a system can be provided that analyzes data structures for errors. The system can include means for receiving a stream of data blocks that include data structures, means for identifying disparate types of data structures, means for utilizing respective check objects to identify an error comprised within the data structures, and means for discarding the data blocks from the stream as they are processed.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the

DESCRIPTION OF THE INVENTION

Figure 1:
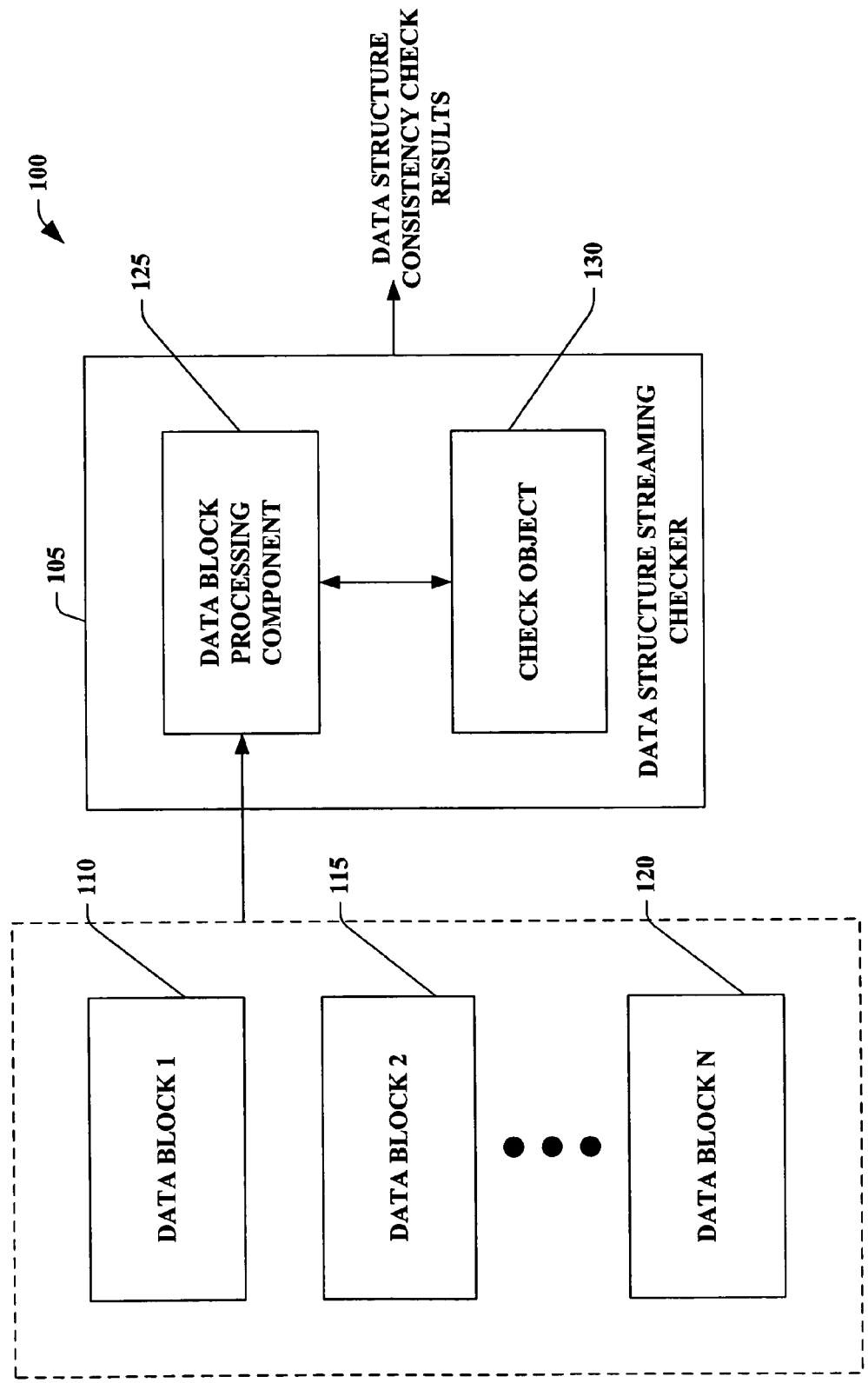
FIG. 1 illustrates a block diagram of a system that facilitates analyzing a data structure to determine the existence of errors in accordance with an aspect of the subject invention.

The subject invention relates to systems and methods that perform consistency checks of user defined type (UDT) fragments utilizing a stream of data without wholesale copying of the data. Streaming consistency checks facilitate discovering invalid fragments as soon as possible such that the entire UDT fragment does not have to be read, stored, analyzed, etc. Additionally, a UDT fragment can be evaluated without being completely materialized; thus, systems and/or methods employing the subject invention can yield improved performance as compared to conventional techniques by reducing required resources and enabling faster detection of invalid structures.

As utilized in this application, terms "component," "system," "object," "detector," "checker," "activator," "generator," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

FIG. 1 illustrates a system 100 that facilitates analyzing a data structure to determine the existence of errors according to an aspect of the subject invention. The system 100 comprises a data structure streaming checker 105 that receives a stream of data (e.g., a data block 1 110, a data block 2 115 . . . a data block N 120, where N is any positive whole number, hereinafter referred to as data blocks 110-120) and provides data structure consistency check results. The data structure streaming checker 105 evaluates data structures (e.g., user defined type (UDT) fragments) that are comprised within the stream of incoming data blocks 110-120 without wholesale storage of data contained within the data blocks 110-120. The data structure consistency check results generated by the data structure streaming checker 105 can be an error notification, an indication signifying a lack of errors, etc. The data structure consistency check results can be utilized by the system 100 (e.g., as feedback that can be employed to stop the stream of data blocks 110-120, to halt processing by the data structure streaming checker 105, . . . ), a disparate software application (not shown), and/or a hardware device (not shown). Additionally or alternatively, the data structure consistency check results can be presented to a user (e.g., via an alarm, a visual display, a log file, . . . ).

The data structure streaming checker 105 includes a data block processing component 125 and a check object 130. The data block processing component 125 receives and processes the data blocks 110-120. By way of illustration, the data block processing component 125 can receive and process the data block 1 110 until the data block 1 110 is exhausted and then discard the data block 1 110; thereafter, the data block processing component 125 can similarly receive, process and discard additional data blocks 115-120 until all such data blocks have been evaluated. While processing the data block 1 110 (and similarly the other data blocks 115-120), the data block processing component 125 can track a current position within the data block 1 110 and activate a relevant check object 130 associated with the data structure at the particular location within the data block 1 110.

The check object 130 performs a consistency check on the data structure for which it was activated. For example, the check object 130 can be utilized to determine the existence of errors within the data structure. The check object 130 can evaluate data structures in a streaming manner without having to materialize the entire data structure; conventional techniques, in contrast, typically require copying an entire data structure to memory and, thereafter, evaluating the stored data structure. The check object 130 can also facilitate materializing basic data types associated with the data structures that have been split between disparate data blocks 110-120.

The data blocks 110-120 can comprise any number of data structures (e.g., UDT fragment(s)). Each of the data blocks 110-120 can be a data page, which is stored according to an on-disk format and is utilized to store the data structure(s). Additionally or alternatively, each of the data blocks 110-120 can be a data packet that can be transferred (e.g., in an on-the-wire format, . . . ) such as between devices in a network environment.

The data blocks 110-120 can be any length (e.g., 1 byte, infinitely large, . . . ), so long as the length is known and/or can be determined. For instance, the size of the data blocks 110-120 can be a pre-set length known by the data block processing component 125. Alternatively, the data block processing component 125 can identify the length of the data blocks 110-120. The size of the data blocks 110-120 is employed by the data block processing component 125 and/or the check object 130 to detect an end of a data block 110-120 during processing. According to an example, the data pages (and/or data packets) can be eight kilobytes in size; however, the subject invention is not so limited.

The size of the data structures stored within the data blocks 110-120 (e.g., data pages, data packets, . . . ) can vary depending on the data type and/or associated payload. Alternatively, some of the data structures can have a set length and/or structure. The data structures do not have to be wholly stored within a single data block (e.g., data block 1 110). A data structure can be associated with any number of data block(s) 110-120 and/or portions of data block(s) 110-120. According to an example, half of one data structure can be at the end of a first data block (e.g., data block 1 110) and a second half of the fragment can be existent within a next data block (e.g., data block 2 115). The location of the split of the data structure can be a function of an amount of available space associated with a data block (e.g., data block 1 110), such that a remaining portion of the data structure is existent within subsequent data block(s) (e.g., data block 2 115 . . . data block N 120), as necessary.

Figure 2:
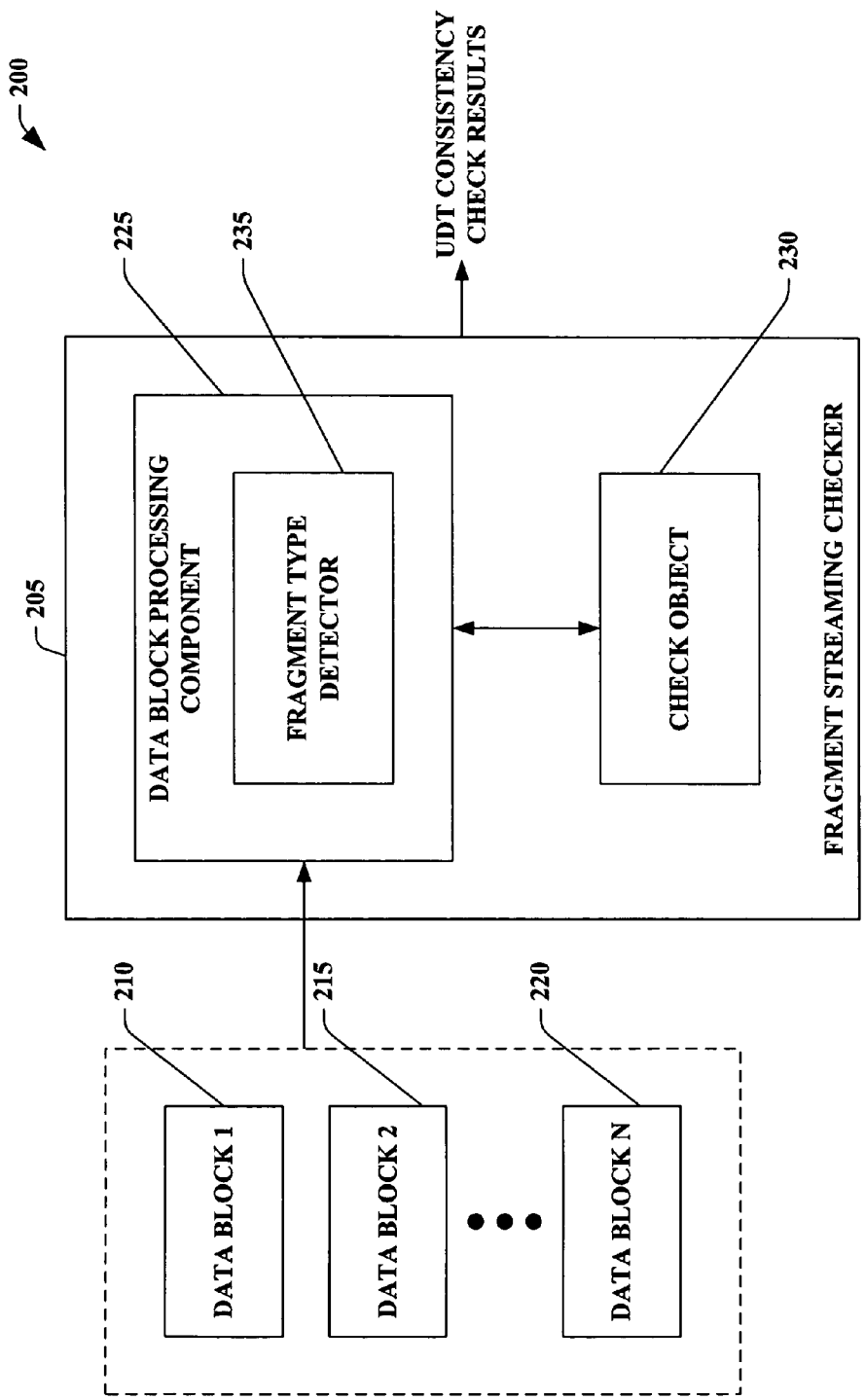
FIG. 2 illustrates a block diagram of a system that facilitates analyzing and/or verifying UDT fragments via utilizing a streaming check in accordance with an aspect of the subject invention.

With reference to FIG. 2, illustrated is a system 200 that facilitates analyzing and/or verifying UDT fragments via utilizing a streaming check in accordance with an aspect of the subject invention. The system 200 includes a fragment streaming checker 205 (e.g., data structure streaming checker 105) that analyzes a stream of incoming data blocks (e.g., a data block 1 210, a data block 2 215 . . . a data block N 220) and generates UDT consistency check results. The fragment streaming checker 205 can determine, for example, that UDT fragments comprised within the data blocks 210-220 include one or more errors or that the UDT fragments lack errors. Examples of errors that can be generated are that the UDT fragment is of an unknown type, is shorter than a minimum length for its type, and/or has improper values for reserved bits; however, the subject invention is not so limited.

The fragment streaming checker 205 comprises a data block processing component 225 that receives the incoming stream of data blocks 210-220 and a check object 230. The data block processing component 225 further comprises a fragment type detector 235. The fragment type detector 235 evaluates the data associated with the data blocks 210-220 received via the data block processing component 225. In particular, the fragment type detector 235 identifies unique structural attributes of particular UDT fragments within the data blocks 210-220 to determine the data type of the fragment. For instance, the fragment type detector 235 can analyze a type word at the beginning of a UDT fragment that can be indicative of the fragment type; however, the subject invention is not so limited.

Thus, by way of example, the data block processing component 225 can receive a data block 1 210, which can be provided to the fragment type detector 235. The fragment type detector 235 can determine that a UDT fragment is located at a particular position within the data block 210. Furthermore, the fragment type detector 235 can identify the data type associated with each UDT fragment (e.g., integer, floating point, string, date, binary, boolean, character, short, long, . . . ) and/or whether the UDT fragment is a start of a collection, an end of a collection, a null value, or a UDT start; however, the subject invention is not so limited. The fragment type detector 235 can then provide the identified type information to the check object 230, which can properly check the UDT fragment based on the type. Alternatively or additionally, the fragment type detector 235 can initiate a particular check object 230 related to the identified type. Thereafter, the check object 230 performs a consistency check upon the particular UDT fragment, which can yield the UDT consistency check results.

The fragment streaming checker 205 can analyze UDT fragments that are existent within data blocks 210-220. UDTs are a database extensibility mechanism that enables modeling and manipulation of complex types within a storage environment. A UDT can comprise a series of fragments of disparate types (e.g., integer, floating point, string, date, binary, boolean, character, short, long, . . . ). The UDT fragment can comprise metadata that indicates a fragment type. This metadata can be employed by the fragment type detector 235 to determine the fragment type. For instance, a respective check object 230 can be utilized based on the determined fragment type. Additionally or alternatively, the check object 230 can evaluate the UDT fragment in view of the determined fragment type to identify the existence of an error. The size of the fragments can vary depending on the data type and/or associated payload. Alternatively, some of the fragments can have a set length and/or structure.

By way of illustration and not limitation, a UDT can be employed to represent information associated with a person. Thus, the UDT can have disparate fragments associated with a first name, last name, age, gender, a list of phone numbers, a list of addresses, a list of associated people (e.g., relatives, coworkers, . . . ), etc. Pursuant to this example, character data types can be employed for the fragments associated with the first and last name, an integer data type can be utilized to represent the age, and a boolean data type can be used for gender (e.g., male or female). Additionally, the phone numbers can be stored as a list, where each of the phone numbers utilizes the character data type. Further, each address can be a combination of various types, since an address can include a street number, a street, an apartment number, a town/city, a state, a zip code, a country, etc. The UDT can also have a start fragment that denotes the beginning of the UDT within the data blocks 210-220, collection starts and collection ends that respectively indicate the beginning and end of lists and/or null elements. The start fragment, collection start, collection end, and/or null element can have a set length and/or structure. An example of a collection is a list of phone numbers, and the collection start and collection end can designate certain UDT fragments there between that are members of the collection.

UDT fragments do not have to be wholly stored within a data page. For instance, half of one fragment can be at the end of one data page and the second half of the fragment can be stored on the next data page. The subject invention contemplates that a UDT fragment can span any portion of a data page and/or any number of data pages. The location where the fragment is split can be arbitrary such that a UDT fragment is stored on a first data page to the extent that there is available space and the remainder is stored on a separate data page. According to an illustration, if a UDT fragment is 6000 bytes, but a data page only has 2000 bytes of available space (e.g., data block 1 210 only has 2000 bytes available), the remaining 4000 bytes will be stored on a separate data page (e.g., data block 2 215 can store the remainder). Pursuant to this example, the fragment streaming checker 205 can provide data structure consistency check results as the data blocks 210-220 are streaming. When a UDT fragment is split between disparate data blocks 210-220, the check object 230 can track how far through the UDT fragment the check has progressed at the point where a first data block (e.g., data block 1 210) is exhausted and store only minimal metadata associated with the UDT fragment to facilitate checking the remainder of the UDT fragment that begins in the next data block (e.g., data block 2 215). The stored metadata can enable the check object 230 to continue checking the remainder of the UDT fragment without having to reevaluate the previously analyzed portion associated with the first data block (e.g., data block 1 210). Additionally, the metadata can describe the structure of the UDT fragment as opposed to store the column values of the UDT fragment. Alternatively, conventional techniques in connection with the above example would copy both the 2000 byte section and the 4000 byte section into memory, and thereafter process the data.

UDT fragments can be similarly formatted within data packets that are utilized for transmission. Currently employed techniques for consistency checking of data packets yield an additional cost, which is not incurred with respect to data pages that are stored, related to an inability to determine validity of a fragment until the entire fragment has been received from a network. This cost is additionally mitigated via the fragment streaming checker 205 utilized in connection with the subject invention.

Figure 3:
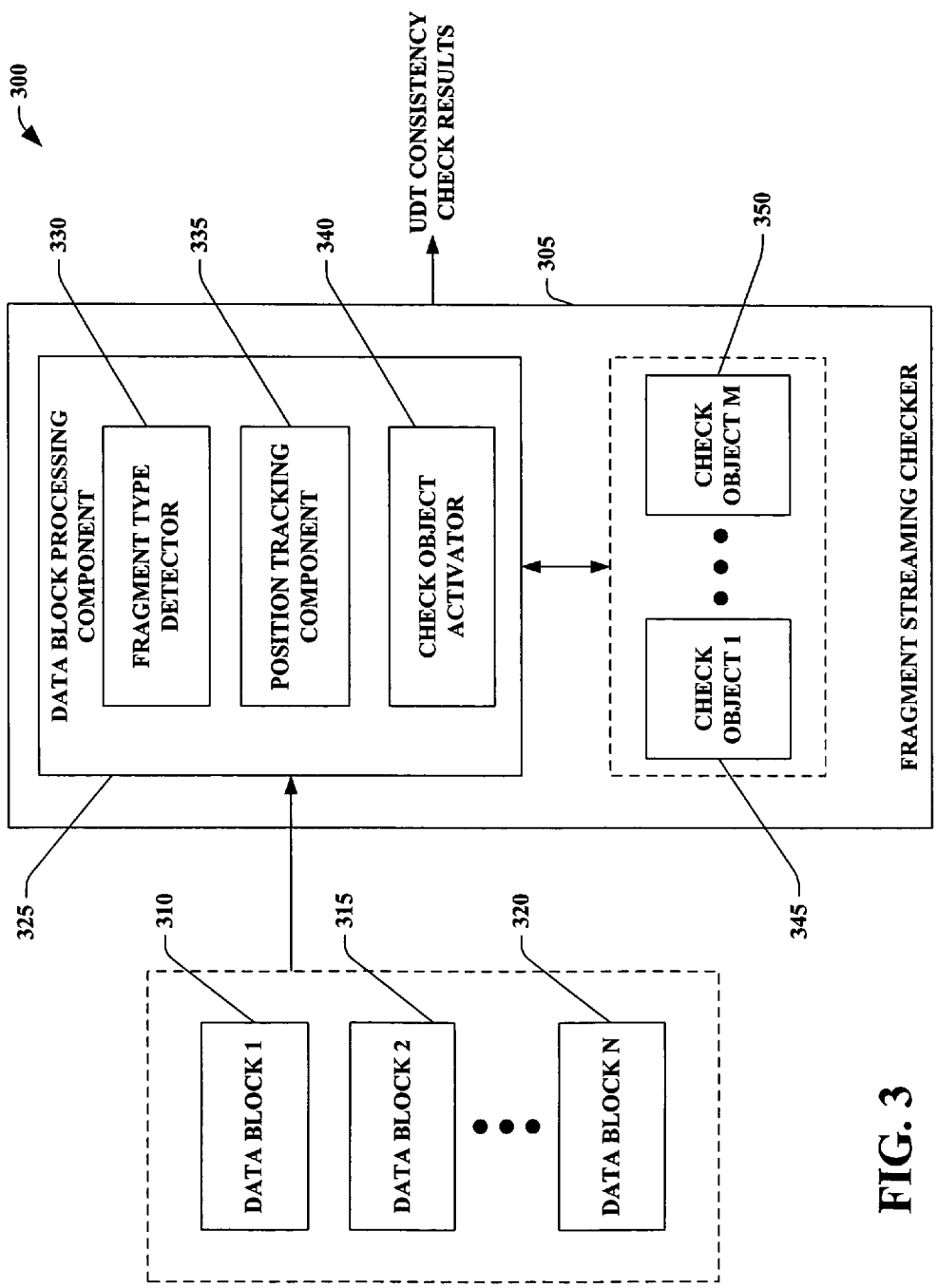
FIG. 3 illustrates a block diagram of a system that performs streaming checks to detect invalid structures via employing a respective check object for each UDT fragment type in accordance with an aspect of the subject invention.

Turning to FIG. 3, illustrated is a system 300 that performs streaming checks to detect invalid structures via employing a respective check object for each UDT fragment type in accordance with an aspect of the subject invention. The system 300 comprises a fragment streaming checker 305 that receives and processes data blocks 310, 315, 320 to determine UDT consistency check results. The fragment streaming checker 305 can receive one data block out of the set of data blocks 310-320 at a particular time. Thus, according to this example, the fragment streaming checker 305 can receive a first data block (e.g., data block 1 310), which can be processed until exhausted and thereafter discarded; at that point, a second data block (e.g., data block 2 315) can sequentially be obtained by the fragment streaming checker 305 and similarly evaluated in its entirety and removed, and so on.

The fragment streaming checker 305 includes a data block processing component 325 that receives and processes the data blocks 310-320. The data block processing component 325 can comprise a fragment type detector 330, a position tracking component 335, and a check object activator 340. The fragment streaming checker 305 additionally includes a set of check objects (e.g., a check object 1 345 . . . a check object M 350, where M is any positive whole number, hereinafter referred to as check objects 345-350) that each evaluate a specific fragment type.

The data block processing component 325, for example, can receive one data block (e.g., data block 1 310) out of the set of data blocks 310-320 at a time. The position tracking component 335 tracks a current position that is being evaluated within the received data block 1 310. At the currently evaluated location, the fragment type detector 330 identifies a type of UDT fragment (e.g., integer, floating point, string, date, binary, boolean, character, short, long, collection start, collection end, null value, UDT start, . . . ). The type of UDT fragment is employed by the check object activator 340, which can activate and call a relevant check object (e.g., check object 1 345) from the set of check objects 345-350. The called check object (e.g., check object 1 345) evaluates the UDT fragment within the data block 1 310 for any errors and generates the UDT consistency check results. The check object (e.g., check object 1 345) can provide a notification to the data block processing component 325 indicating that the evaluation of the UDT fragment has been completed. Additionally or alternatively, the position tracking component 335 can determine that the location currently being evaluated is either at the end of a data block 1 310 or is outside of the UDT fragment for which the check object (e.g., check object 1 345) was called. Furthermore, the position tracking component 335 can determine that an active check object (e.g., check object 1 345) is waiting for another portion of a UDT fragment from a disparate data block. If this additional portion of the UDT fragment is not received by the data block processing component 325, a signal can be produced that indicates that the UDT fragment is incomplete.

Upon completion of evaluation of a UDT fragment by the relevant check object (one of check objects 345-350), the position tracking component 335 determines whether there is another UDT fragment (e.g., entire fragment, portion of a fragment, . . . ) at a next location of the data block 1 310 or whether the data block 1 310 is exhausted. For example, if the data block 1 310 includes at least another portion of a UDT fragment, the fragment type detector 330 and the check object activator 340 again are utilized to determine a proper check object from the set of check objects 345-350, which is employed to evaluate the UDT fragment. Alternatively, if the position tracking component 335 indicates that the data block 1 310 is exhausted, the data block 1 310 is discarded by the data block processing component 325 and a subsequent data block 2 315 is received and processed if another data block 2 315 is part of the stream. Pursuant to an example, the fragment streaming checker 305 can receive a signal indicating an end of the stream of data blocks 310-320 and/or identify the end of the stream. Upon receiving a signal indicating the end of the stream, the fragment streaming checker 305, for example, can generate an error (e.g., if the last UDT fragment is incomplete, . . . ) and/or stop execution.

Figure 4:
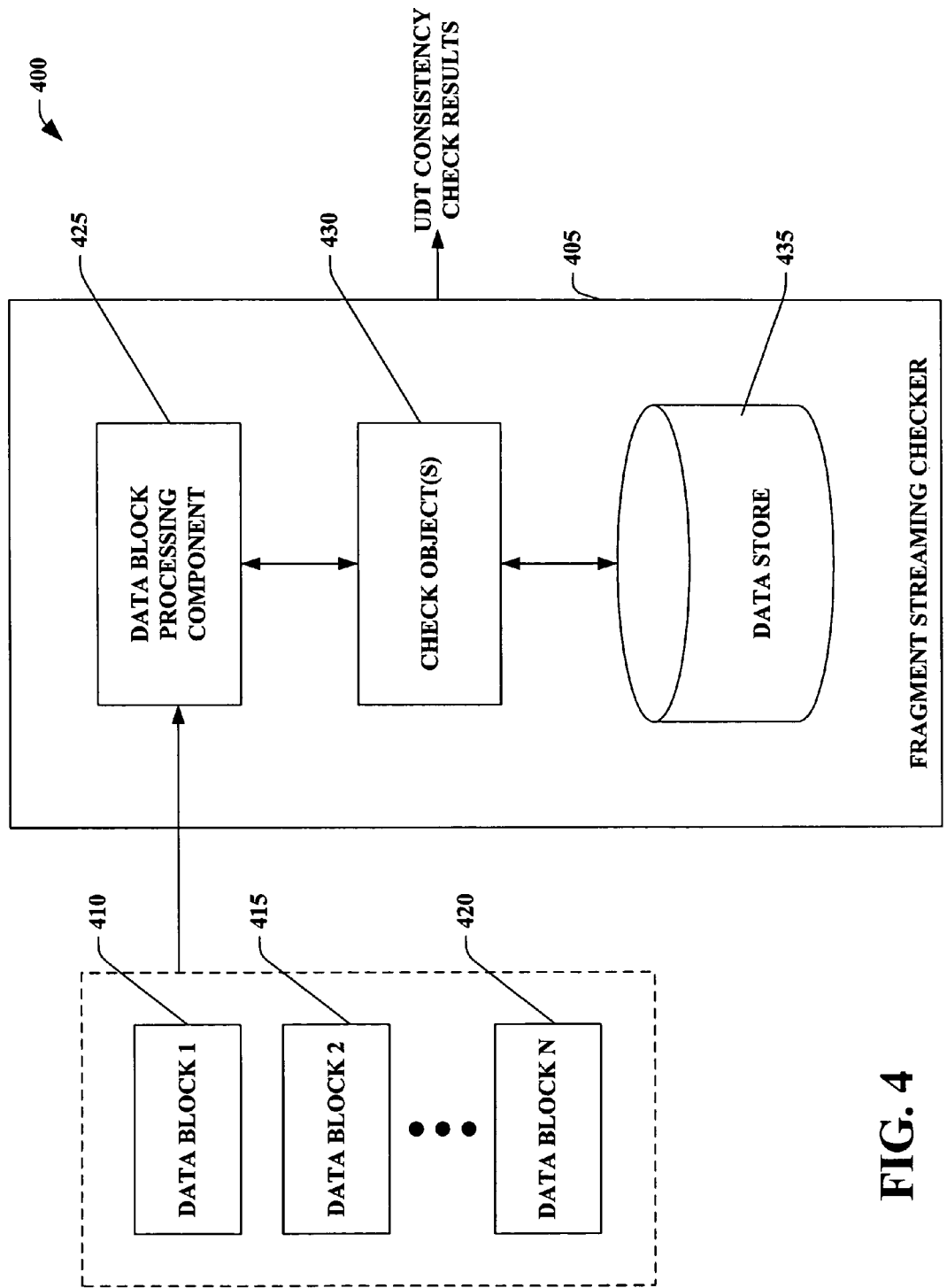
FIG. 4 illustrates a block diagram of a system that evaluates validity of UDT fragments utilizing a streaming examination that can store minimal data in accordance with an aspect of the subject invention.

FIG. 4 illustrates a system 400 that evaluates validity of UDT fragments utilizing a streaming examination that can store minimal data in accordance with an aspect of the subject invention. The system 400 includes a fragment streaming checker 405 that receives and analyzes a stream of data blocks 410, 415, 420 (e.g., data pages, data packets, . . . ) and generates UDT fragment consistency check results. The data blocks 410-420 can include a number of UDT fragments, which can have varying sizes. Additionally, the UDT fragments can be contained within a portion of a data block (e.g., portion of the data block 1 410), have a section that is part of a first data block (e.g., the data block 1 410) and a section that is part of a second data block (e.g., the data block 2 415), or be included as part of any number of data blocks 410-420.

The fragment streaming checker 405 further comprises a data block processing component 425, any number of check objects 430, and a data store 435. The data block processing component 425 receives and processes the incoming stream of data blocks 410-420. The data block processing component 425 tracks a current position within a data block (e.g., data block 1 410) and can determine the type of UDT fragment at that current position. Additionally, the fragment type information can be employed to initiate a proper check object 430 that is specific to the UDT fragment type. The data block processing component 425 can repeat the tracking, determining the fragment type, and activating the relevant check objects 430 until an error is found or the data block (e.g., data block 1 410) is exhausted. It is to be appreciated that the data block processing component 425 can comprise a fragment type detector 330 (FIG. 3), a position tracking component 335 (FIG. 3), and/or a check object activator 340 (FIG. 3).

The check object(s) 430 are utilized to check particular UDT fragments as instructed via the data block processing component 425. According to an example, the check object(s) 430 can identify invalid UDT fragment structures as the stream of data blocks 410-420 is being received and processed by the data block processing component 425. Upon detection of an error (e.g., without materializing the entire data block 410-420), the check object(s) 430 can provide a signal that indicates that the UDT fragment includes an error. For instance, the data block processing component 425 can halt processing of the particular data block 410-420 and/or UDT fragment that contains the error upon such a determination by the check object(s) 430.

The check object(s) 430 can additionally track progress of a UDT fragment check. Thus, a particular check object 430 can be associated with a data type that has a fixed format with two bytes of data, representing two single-byte values, for example, both of which must be validated. Pursuant to this example, the check object 430 can identify, for instance, that a check has progressed through one byte and has yet to reveal any errors. The identified progress (e.g., that there remains another byte value to validate) can be stored in the data store 435, provided to the data block processing component 425 (e.g., to indicate that subsequent data blocks 410-420 should contain the remainder of the UDT fragment), etc. It should be noted that the byte value processed thus far need not be stored.

By way of another example, the data type can have a fixed format that contains an integer value representing a string length, and the last character in the string should contain a certain value (e.g., '*'). Once the integer value has been processed, the check object 430 knows that the character at the end of the string is to be examined. The amount of data that is skipped is stored in the length of the string. The check object 430 reads to the end of the data block (e.g., data block 1 410) and tracks how many more bytes of the string are to be read before the final character is reached. Thus, the string length and the number of bytes yet to be read can be stored in the data store 435, as opposed to storing the entire string that has been processed thus far. Once the next data block (e.g., data block 2 415) is received and passed to the check object 430, it continues reading until it reaches and validates the final character in the string. Thus, the amount of storage is reduced as compared to conventional techniques since the whole fragment need not be materialized in its entirety.

The check object(s) 430 also can store any data necessary for checking the remainder of a UDT fragment in the data store 435. According to an example, a data block processing component 425 can determine (e.g., via the fragment type detector 330 (FIG. 3)) that a data block (e.g., data block 1 410) comprises a UDT fragment that is a four byte integer. The data block processing component 425 can activate a relevant check object 430 that specifically checks integer type fragments (e.g., via the check object activator 340 (FIG. 3)). The activated check object 430 evaluates the UDT fragment for the existence of any errors and simultaneously can track the progress of the evaluation. If the end of the data block (e.g., data block 1 410) is reached, such that only one byte from the four total bytes comprising the integer has been read, the activated check object 430 can store the progress (e.g., the single byte read thus far) in the data store 435. Additionally, metadata associated with the read one byte can be stored in the data store 435 (e.g., that one byte had been read and that three more must be read before the integer value can be instantiated and validated). Upon the next data block (e.g., data block 2 415) being processed, the stored metadata can be obtained from the data store 435 and utilized when reading the remaining three bytes. Once these have been read, all four bytes comprising the integer are available and it can be instantiated and validated. According to another example, metadata that describes part of the structure can be stored in the data store 435 simultaneously with the check object(s) 430 analyzing the UDT fragments.

The data store 435 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 435 of the subject systems and methods is intended to comprise, without being limited to, these and any other suitable types of memory. The subject invention contemplates that the data store 435 can be part of the fragment streaming checker 405 as depicted, part of the check object(s) 435, a separate component, or a combination thereof. Additionally, for example, the data store 435 can comprise a file and/or database that is stored on a hard disk and loaded into memory at execution time.

Figure 5:
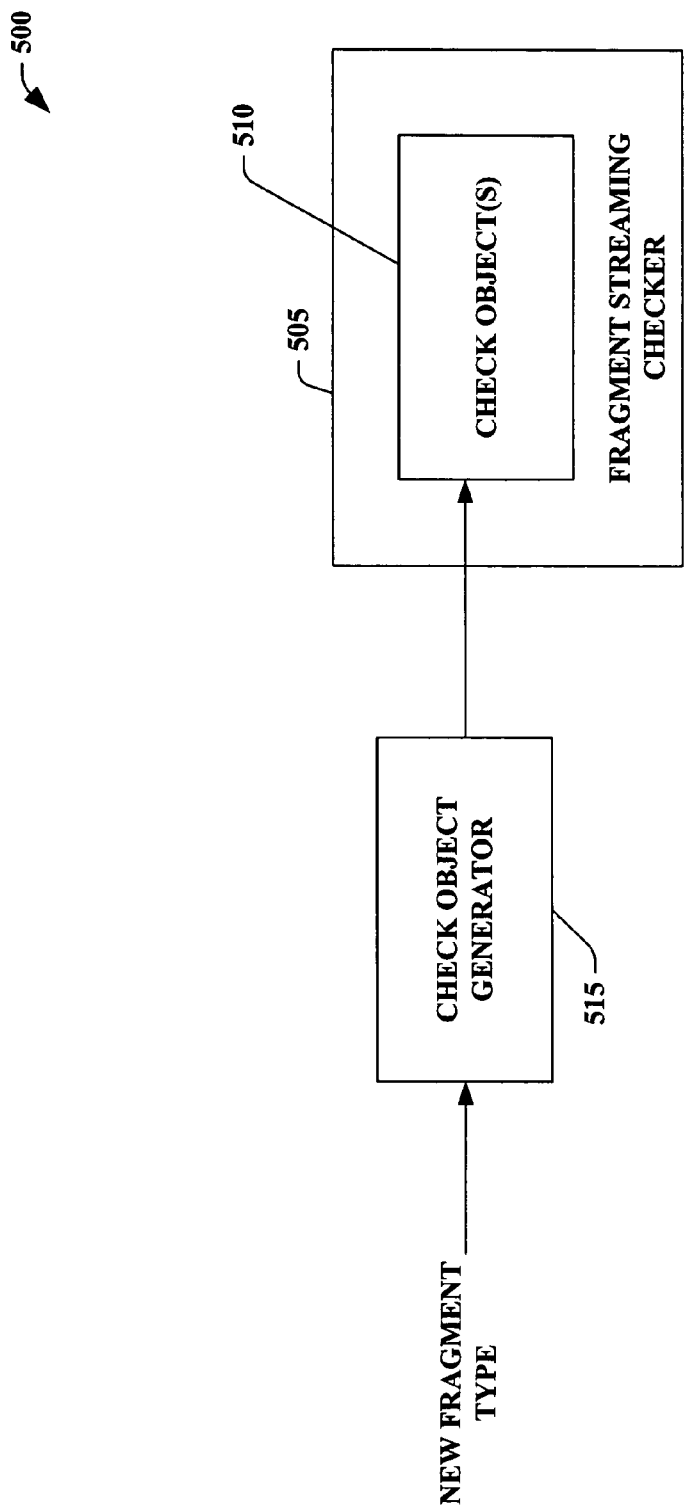
FIG. 5 illustrates a block diagram of a system that generates a check object that can be employed to evaluate a corresponding UDT fragment type in accordance with an aspect of the subject invention

With reference to FIG. 5, depicted is a system 500 that generates a check object that can be employed to evaluate a corresponding UDT fragment type in accordance with an aspect of the subject invention. The system 500 includes a fragment streaming checker 505 that further comprises a number of check object(s) 510. Each of the check object(s) 510 is employed to evaluate a corresponding UDT fragment type as described supra. The subject invention contemplates the use of any number of check object(s) 510.

The system 500 additionally includes a check object generator 515 that enables extensibility of the fragment streaming checker 505 as a whole when a new fragment type is introduced. The check object generator 515 can yield a new check object, which can be added to the existing set of check object(s) 510, that corresponds to a new UDT fragment type (e.g., UDT fragment type for which there was not previously a corresponding check object in the set of check object(s) 510). Thus, when the fragment streaming checker 505 evaluates a UDT fragment that is of the new type, the new check object created via the check object generator 515 is utilized to evaluate the fragment. The check object generator 515 can automatically generate a new check object when a new fragment type is introduced. Alternatively, a user can provide information to generate the new check object.

Figure 6:
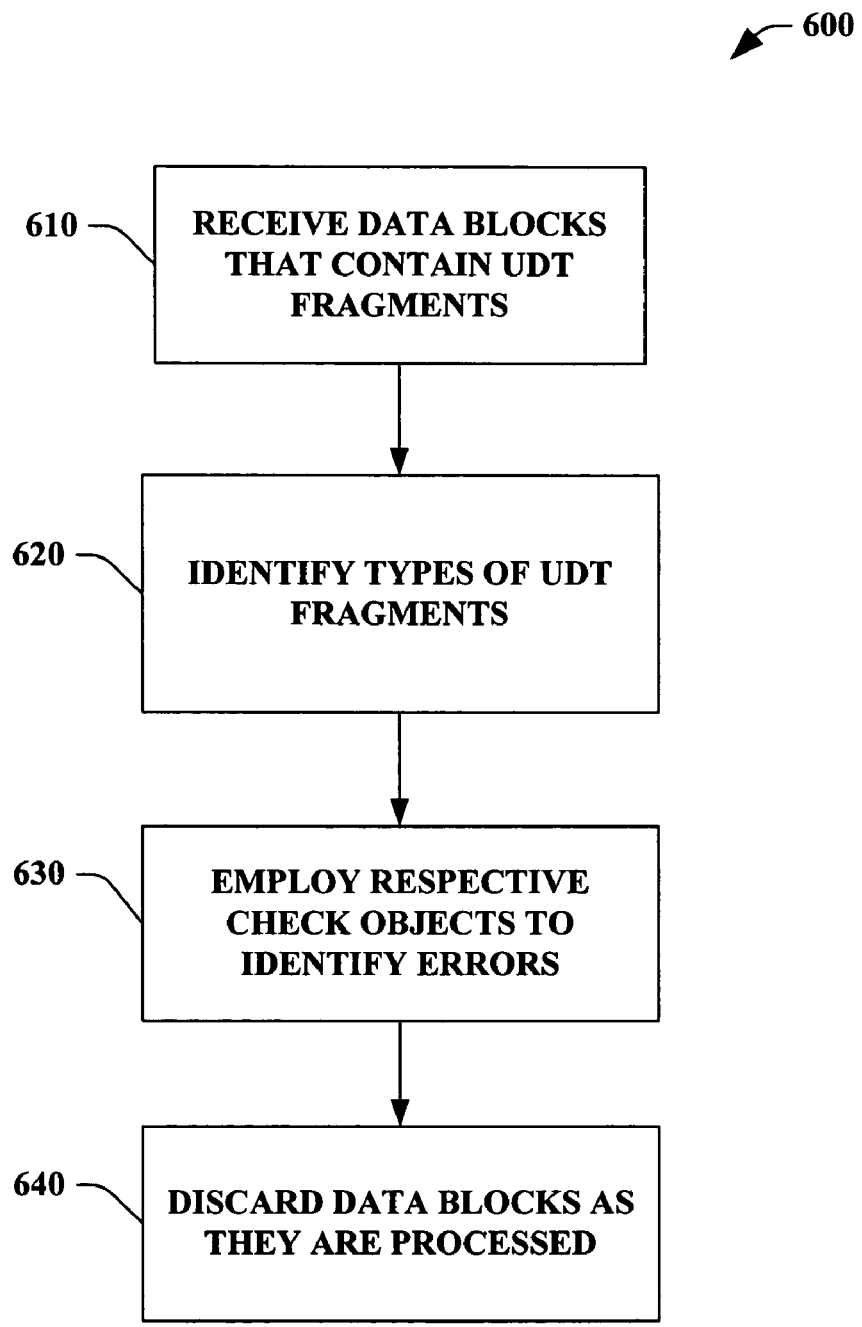
FIG. 6 illustrates a flow chart of an exemplary methodology that facilitates evaluating UDT fragments for errors utilizing a streaming check in accordance with an aspect of the subject invention.
Figure 7:
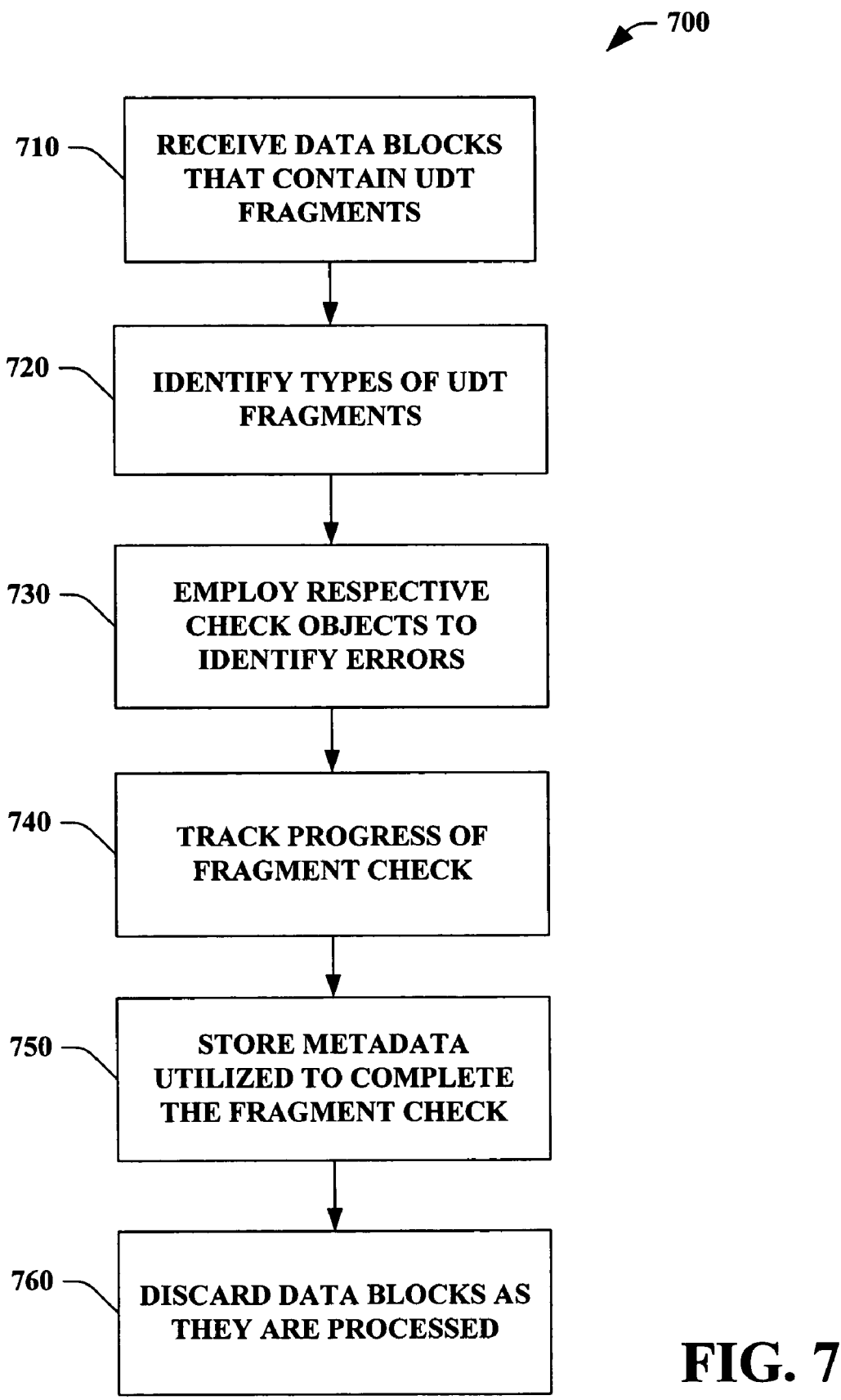
FIG. 7 illustrates a flow chart of an exemplary methodology that facilitates performing streaming consistency checks on UDT fragments via evaluating progress of the checks in accordance with an aspect of the subject invention.
Figure 8:
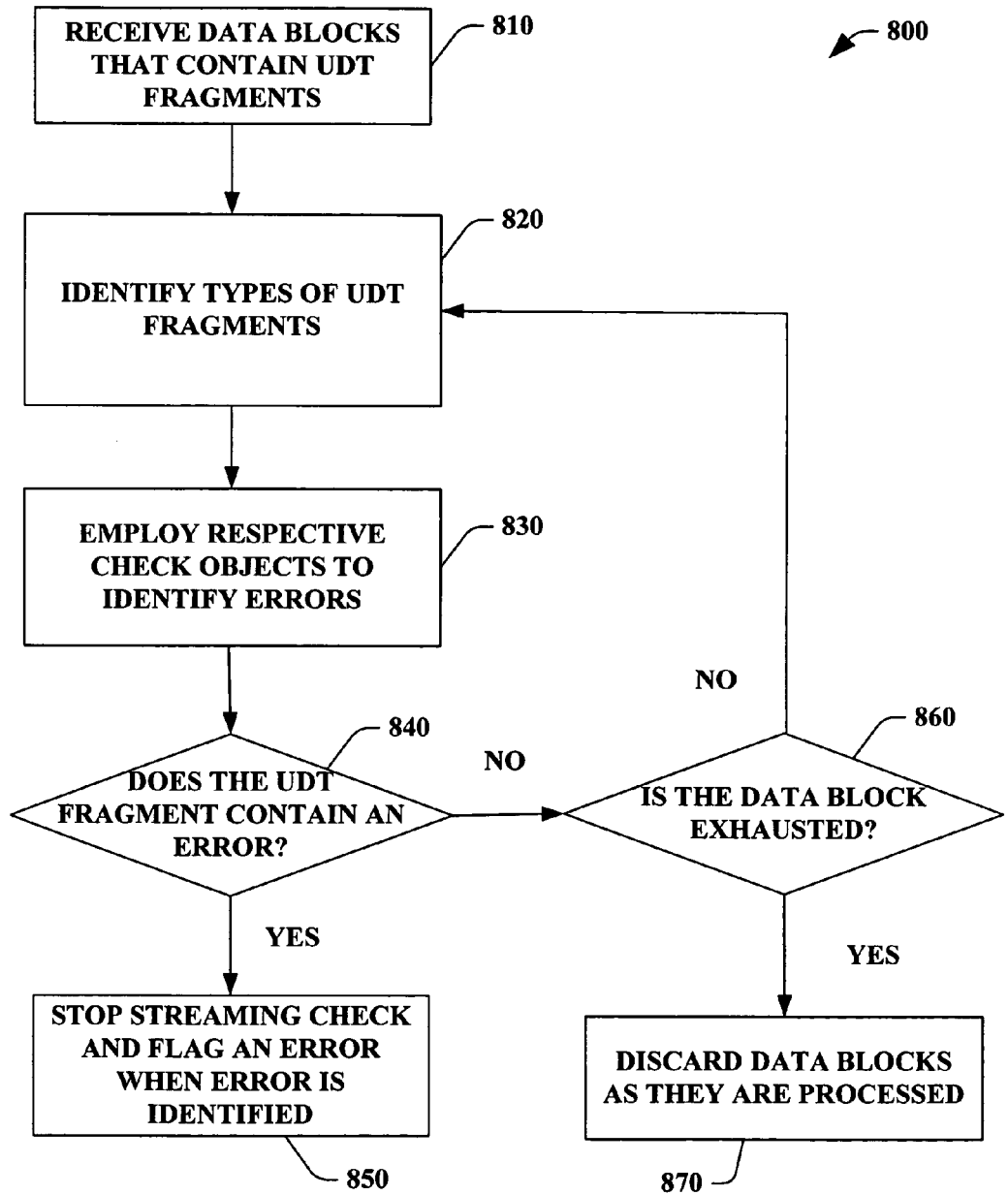
FIG. 8 illustrates a flow chart of an exemplary methodology that facilitates analyzing UDT fragments for errors and stopping a streaming check upon identification of the errors in accordance with an aspect of the subject invention.

FIGS. 6-8 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 6 illustrates a methodology 600 that facilitates evaluating user defined type (UDT) fragments for errors utilizing a streaming check according to an aspect of the subject invention. At 610, data blocks that include UDT fragments are received. The data blocks can be, for example, data pages utilized for storing information and/or data packets employed for transmitting information. For example, the data blocks can be received one at a time, such that a first data block is received and processed in its entirety, followed by a second data block being received and processed, and so on. The data blocks can be received via a network connection (e.g., a wireless connection, a wired connection, a combination thereof, . . . ). Alternatively or additionally, the data blocks can be received from storage (e.g., a database, . . . ). UDT fragment types are identified at 620. By way of illustration, the UDT fragment types can be determined via evaluating a type word at the beginning of a UDT fragment; however, the subject invention is not so limited. At 630, respective check objects are employed to identify errors within the UDT fragments. Each UDT fragment type can have an associated check object that facilitates checking the streaming data of that particular type. Additionally, the data blocks are discarded once they have been processed at 640. This differs from conventional techniques that typically materialize the entire UDT fragments in memory, and thereafter analyze the stored data for errors.

Turning to FIG. 7, illustrated is a methodology 700 that facilitates performing streaming consistency checks on UDT fragments via evaluating progress of the checks in accordance with an aspect of the subject invention. At 710, data blocks containing UDT fragments are received. At 720, the UDT fragment types are identified. For instance, the type of each UDT fragment can be determined as the data block is processed. Additionally, the progress through the data block can be tracked. At 730, a check object out of a set of check objects is utilized to identify whether the UDT fragment includes any errors. Each check object in the set of check objects can be designated to a particular UDT fragment type. The progress of the UDT fragment check is tracked at 740. At 750, metadata is stored that can be utilized to complete the consistency check for a UDT fragment. According to an example, if the UDT fragment is partially within a first data block, and the remainder of the UDT fragment is part of a second data block, metadata can be stored that is associated with the evaluation that is performed in connection with the first data block. Thus, metadata that describes part of the structure of the UDT fragment can be stored, as opposed to storing the actual column values (which is typically performed by conventional techniques). At 760, the data blocks are discarded once they have been processed.

FIG. 8 illustrates a methodology 800 that facilitates analyzing UDT fragments for errors and stopping a streaming check upon identification of the errors in accordance with an aspect of the subject invention. At 810, data blocks that contain UDT fragments are received. At 820, the UDT fragments within the received data blocks are examined and the fragment types are determined. At 830, respective check objects related to the identified UDT fragment types are employed. At 840, it is determined whether the UDT fragment contains an error. This determination can be made without materializing the entire UDT fragment, for example. If an error is identified in the UDT fragment, at 850 the streaming check can be halted and an error flag can be issued indicating that an error has been identified. Alternatively, if no errors are identified, it is determined whether the data block is exhausted at 860. If the data block is not exhausted, the methodology returns to 820 to determine the type of the next UDT fragment. However, if the data block is determined to be exhausted at 860, the data block is discarded at 870.

Figure 9:
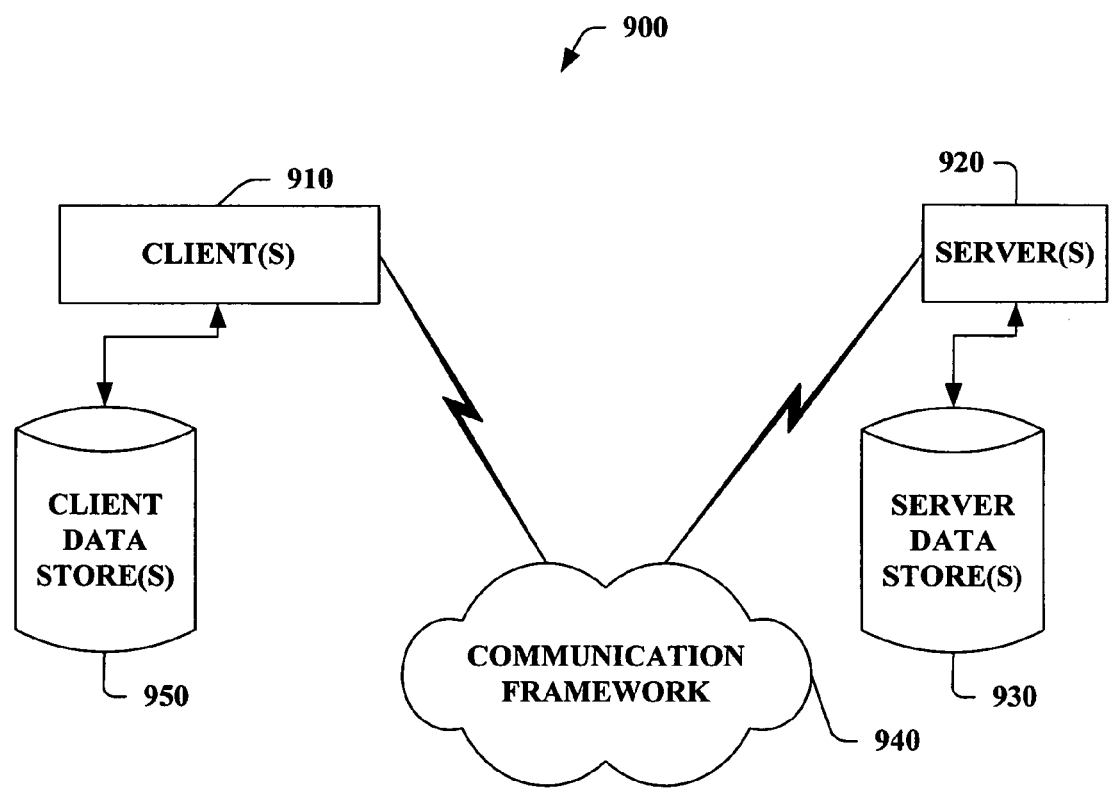
FIG. 9 illustrates an exemplary networking environment, wherein the novel aspects of the subject invention can be employed.
Figure 10:
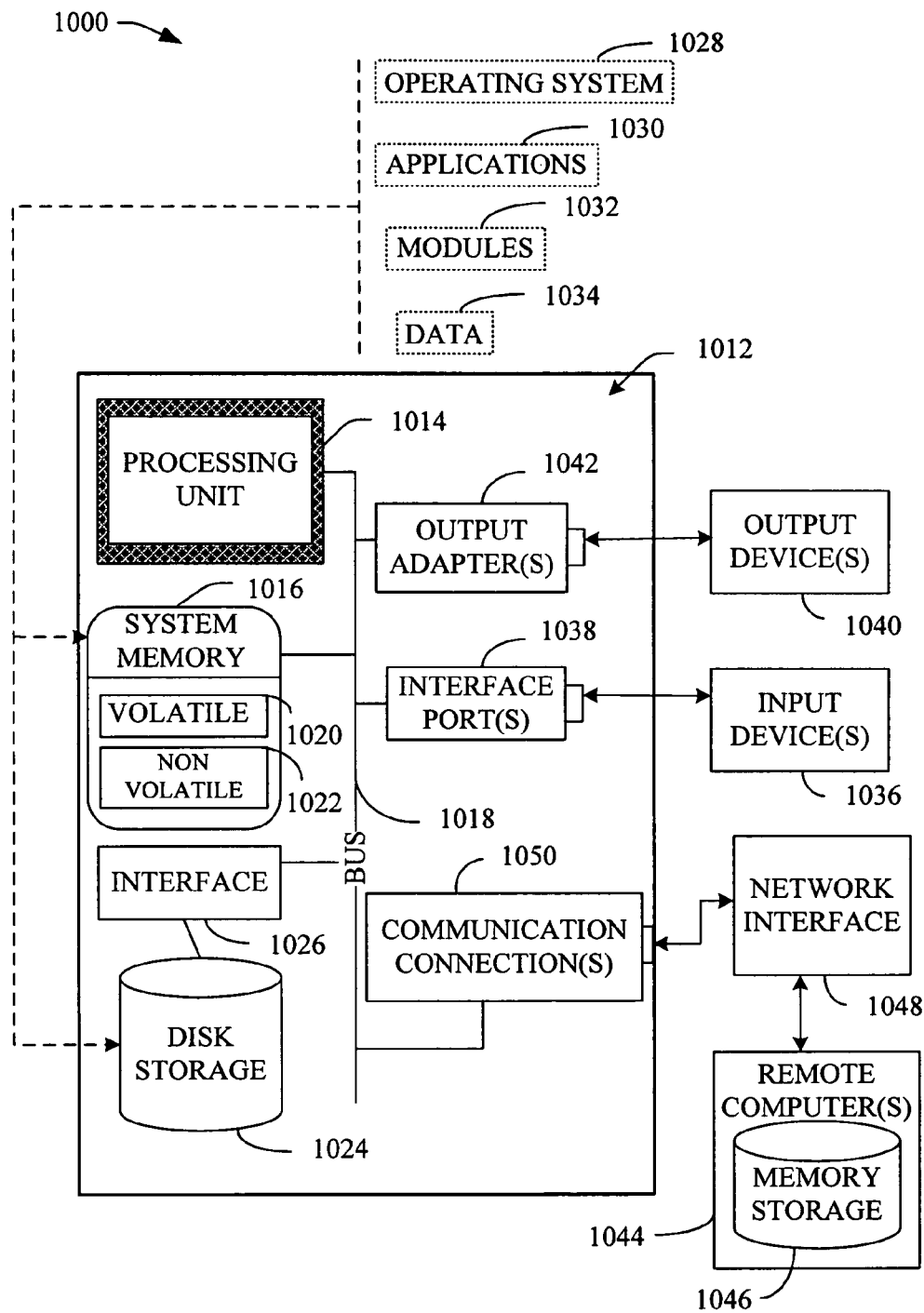
FIG. 10 illustrates an exemplary operating environment, wherein the novel aspects of the subject invention can be employed.

In order to provide additional context for implementing various aspects of the subject invention, FIGS. 9-10 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject invention, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 940.

With reference to FIG. 10, an exemplary environment 1000 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multi-processor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application.

Furthermore, to the extent that the terms "includes," and "including" and variants thereof are used in either the detailed description or the claims, these terms are intended to be inclusive in a manner similar to the term "comprising."

What is claimed is:

1. A computer implemented system that facilitates evaluating user defined type (UDT) fragments for errors, comprising:
a data block processing component receives a stream of data blocks that include UDT fragments, identifies a fragment type for each of the UDT fragments, and discards the data blocks as they are processed, the data block processing component processes the stream of data blocks one block at a time; and
a check object examines the UDT fragments based in part upon the corresponding identified fragment types and generates an indication of an error, the check object tracks how far through a UDT fragment a check has progressed at a point where a first data block is exhausted and stores minimal metadata associated with the UDT fragment that facilitates checking a remainder of the UDT fragment that begins in a next data block for errors associated with the UDT fragment type, when determined that the UDT fragment check is incomplete at the time when the first block is exhausted and the check object is waiting for another portion of the UDT fragment from a next data block,
wherein a memory operatively coupled to a processor retains at least one of the data block processing component or the check object.

2. The system of claim 1, the check object examines the UDT fragments without completely materializing the UDT fragments.

3. The system of claim 1, at least one UDT fragment is split between disparate data blocks.

4. The system of claim 1, further comprising a component that generates a second check object corresponding to a newly presented fragment type.

5. The system of claim 1, the check object further stores metadata associated with a structure of a section of one of the UDT fragments and utilizes the metadata to continue examining a remainder of the one of the UDT fragments.

6. The system of claim 1, the check object determines an extent to which the UDT fragments are examined and stores data necessary to complete the examination.

7. The system of claim 1, further comprising a fragment type detector that identifies the fragment type for each of the UDT fragments via analyzing a type word at a beginning of each of the UDT fragments.

8. The system of claim 1, further comprising a position tracking component that tracks progress of a consistency check for each of the data blocks.

9. The system of claim 8, the position tracking component further determines whether a particular data block is exhausted.

10. The system of claim 1, further comprising a check object activator that initiates a particular check object to analyze a particular fragment type.

11. The system of claim 1, the data block processing component receives and processes the stream of data blocks sequentially.

12. A computer implemented method to facilitate consistency checking of user defined types (UDTs) for errors, comprising:
receiving a data block from a set of data blocks that contains UDT fragments that have varying sizes; identifying a types of a UDT fragments in the received data block;
employing a respective check objects based in part on the identified UDT fragment types to determine if the UDT fragments includes an error;
tracking progress of a UDT fragment check;
determining that if-the UDT fragment is split over two or more blocks;
storing minimal metadata associated with the UDT fragment that is split over two or more blocks to facilitate checking a remainder of the UDT fragment, the minimal metadata describes part of the structure of the UDT fragment; discarding the received block;
receiving a next data block from the set of data blocks that contains the remainder of the UDT fragment; and
processing the remainder of the UDT fragment with the minimal metadata to identify a consistency error associated with the UDT fragment type.

13. The method of claim 12, further comprising tracking progress of a fragment check, storing data necessary to complete the fragment check and discarding a data block when determined that the data black is exhausted.

14. The method of claim 12, farther comprising storing part of a value associated with UDT metadata, and extracting a remainder of the value from a next data block.

15. The method of claim 12, further comprising associating a subset of the data blocks as a function of UDT fragments that correspond to a common UDT.

16. The method of claim 12, further comprising designating a particular check object to check a particular fragment type.

17. The method of claim 12, further comprising identifying common and unique structural aspects associated with the UDT fragments.

18. The method of claim 12, farther comprising processing sequentially data stored in the data blocks.

19. A computer implemented system that analyzes data structures for errors, comprising:
means for receiving a data block from a stream of data blocks that include data structures;
means for identifying disparate types of data structures within the received data block;
means for utilizing respective check objects to identify an error comprised within the data structures;
means for tracking how far through a data structure a check has progressed at a point where a first data block is exhausted;
means for storing minimal metadata associated with the data structure to facilitate checking a remainder of the data structure that is contained in a next data block for consistency errors associated with the data structure type;
means for processing one block from the stream of blocks at one time; and
means for discarding the processed data blocks from the stream as it is processed while saving the minimal metadata associated with the data structure within the processed block;
wherein a memory operatively coupled to a processor retains at least one of the means.

20. The system of claim 19, further comprising means for providing an indication related to the identified error upon discovering an existence of the error without storing a portion of the data structures.

* * * * *